US012388546B2

(12) United States Patent
Nair et al.

(10) Patent No.: US 12,388,546 B2
(45) Date of Patent: Aug. 12, 2025

(54) SYSTEM FOR DATA REGIONALIZATION AND RETRANSMISSION BASED ON BROADCAST RECEPTION CONDITIONS AND USER PREFERENCES

(71) Applicant: INNTOT TECHNOLOGIES PRIVATE LIMITED, Kerala (IN)

(72) Inventors: Rajith Raman Pillai Indusekharan Nair, Kerala (IN); Muhammed Fasil Koonthala, Kerala (IN); Bibina Koliyatt, Kerala (IN); Shamiya Moideen Koya Rasiya, Kerala (IN)

(73) Assignee: Inntot Technologies Private Limited, Kerala (IN)

( * ) Notice: Subject to any disclaimer, the term of this patent is extended or adjusted under 35 U.S.C. 154(b) by 169 days.

(21) Appl. No.: 18/109,443

(22) Filed: Feb. 14, 2023

(65) Prior Publication Data

US 2024/0243828 A1 Jul. 18, 2024

(30) Foreign Application Priority Data

Jan. 13, 2023 (IN) ............................ 202341002902

(51) Int. Cl.
*H04H 20/02* (2008.01)
*H04H 20/38* (2008.01)

(52) U.S. Cl.
CPC ............ *H04H 20/02* (2013.01); *H04H 20/38* (2013.01)

(58) Field of Classification Search
CPC ....... H04H 20/02; H04H 20/38; H04H 20/103
See application file for complete search history.

(56) References Cited

U.S. PATENT DOCUMENTS

| | | | | |
|---|---|---|---|---|
| 6,741,834 B1 * | 5/2004 | Godwin | ........... H04N 21/26266 725/63 |
| 7,190,325 B2 * | 3/2007 | Nagy | ....................... H01Q 3/46 343/756 |
| 7,587,017 B2 * | 9/2009 | Smith | .................... H04H 20/49 375/376 |

(Continued)

FOREIGN PATENT DOCUMENTS

| | | | |
|---|---|---|---|
| AU | 2015240929 A1 * | 9/2016 | ......... H04B 7/18586 |
| CA | 2975429 C * | 7/2023 | ............. H04B 1/126 |

(Continued)

*Primary Examiner* — Berhanu Tadese
(74) *Attorney, Agent, or Firm* — Millen, White, Zelano & Branigan P.C.; William F. Nixon

(57) ABSTRACT

A system ensures reception in low reception or no reception areas and adds regionalized experiences in digital broadcasting. The system includes main transmitter stations and many local or regional transceiver stations. Feedback exists between the local and main transmitter stations to fine tune the transmitted signals based on reception quality, location and the like. The addition of localized or regional content is based on parameters such as user preferences and local data. The regionalized content may vary from local news, local advertisements, customized advertisements, advertisement placement based on social media services data, local emergency warnings, and other parameters. The system addresses both reception issues as well as content regionalization blended with original channel information that are of interest to users of a specific region.

18 Claims, 6 Drawing Sheets

(56) References Cited

U.S. PATENT DOCUMENTS

| | | | | | |
|---|---|---|---|---|---|
| 7,711,335 | B2 * | 5/2010 | Morris | H04B 7/18517 455/133 |
| 7,881,416 | B2 * | 2/2011 | Smith | H04H 20/49 375/354 |
| 8,036,592 | B2 * | 10/2011 | Godwin | H04N 21/6112 455/7 |
| 8,073,422 | B2 * | 12/2011 | Langsenkamp | H04L 12/189 455/427 |
| 8,335,872 | B2 * | 12/2012 | Pahuja | H04H 20/26 710/36 |
| 8,463,216 | B2 * | 6/2013 | Thomas | H04B 17/345 455/166.1 |
| 8,548,408 | B2 * | 10/2013 | Jaisimha | H04H 20/22 455/185.1 |
| 8,886,142 | B2 * | 11/2014 | Thomas | H04L 25/08 455/166.1 |
| 9,148,128 | B2 * | 9/2015 | Jaisimha | H03J 7/18 |
| 9,484,966 | B2 * | 11/2016 | Thomas | H04B 1/1027 |
| 9,602,081 | B2 * | 3/2017 | Jaisimha | H03J 7/183 |
| 9,838,053 | B2 * | 12/2017 | Thomas | H04L 25/08 |
| 10,021,435 | B2 * | 7/2018 | Buono | H04L 63/10 |
| 10,085,235 | B2 * | 9/2018 | Buono | H04N 21/21805 |
| 10,187,670 | B2 * | 1/2019 | Buono | H04L 63/10 |
| 10,574,372 | B1 * | 2/2020 | Nair | H04H 20/47 |
| 11,019,600 | B2 * | 5/2021 | Buono | H04L 9/06 |
| 11,509,408 | B1 * | 11/2022 | Nair | H04H 20/86 |
| 11,838,566 | B2 * | 12/2023 | Nair | H04N 21/2365 |
| 2004/0172647 | A1 * | 9/2004 | Godwin | H04N 21/6143 725/63 |
| 2006/0109808 | A1 * | 5/2006 | Ritter | H04H 20/02 370/465 |
| 2006/0195239 | A1 * | 8/2006 | Teichner | H04H 20/26 701/469 |
| 2008/0008285 | A1 * | 1/2008 | Smith | H03D 3/248 375/376 |
| 2009/0296856 | A1 * | 12/2009 | Smith | H04L 27/06 455/295 |
| 2010/0166122 | A1 * | 7/2010 | Pahuja | H04H 20/26 375/344 |
| 2017/0085328 | A1 * | 3/2017 | Dickemann, Jr. | H04H 20/02 |
| 2017/0338902 | A1 * | 11/2017 | Buono | H04L 41/22 |
| 2017/0339436 | A1 * | 11/2017 | Buono | H04W 12/03 |
| 2017/0339668 | A1 * | 11/2017 | Buono | H04H 20/59 |
| 2018/0242026 | A1 * | 8/2018 | Buono | H04N 7/04 |
| 2019/0110274 | A1 * | 4/2019 | Buono | H04N 21/25816 |
| 2023/0336262 | A1 * | 10/2023 | Kim | H04H 40/27 |
| 2024/0243828 | A1 * | 7/2024 | Nair | H04H 20/103 |
| 2024/0267142 | A1 * | 8/2024 | Parangodath | H04H 40/18 |

FOREIGN PATENT DOCUMENTS

| | | | | | |
|---|---|---|---|---|---|
| CN | 1988539 | A | * | 6/2007 | |
| CN | 1988539 | B | * | 6/2010 | |
| CN | 102246451 | B | * | 7/2015 | H04H 20/02 |
| CN | 105637769 | A | * | 6/2016 | H04H 20/22 |
| CN | 106165319 | A | * | 11/2016 | H04B 7/18586 |
| CN | 108886637 | A | * | 11/2018 | H04H 20/28 |
| CN | 109314799 | B | * | 12/2020 | G06F 3/1454 |
| CN | 107211185 | B | * | 2/2021 | H04N 21/26283 |
| CN | 112543377 | A | * | 3/2021 | G06F 3/1454 |
| CN | 112543378 | A | * | 3/2021 | G06F 3/1454 |
| CN | 112543379 | A | * | 3/2021 | G06F 3/1454 |
| CN | 112543380 | A | * | 3/2021 | G06F 3/1454 |
| CN | 112543381 | A | * | 3/2021 | G06F 3/1454 |
| CN | 112911396 | A | * | 6/2021 | H04N 21/26283 |
| CN | 112911397 | A | * | 6/2021 | H04N 21/26283 |
| CN | 112911398 | A | * | 6/2021 | H04N 21/26283 |
| CN | 107925784 | B | * | 7/2021 | H04N 21/431 |
| CN | 113259747 | A | * | 8/2021 | H04N 21/431 |
| CN | 113259748 | A | * | 8/2021 | H04N 21/431 |
| CN | 113259749 | A | * | 8/2021 | H04N 21/431 |
| CN | 113259750 | A | * | 8/2021 | H04N 21/431 |
| CN | 113259751 | A | * | 8/2021 | H04N 21/431 |
| CN | 108028958 | B | * | 9/2021 | A61P 27/02 |
| CN | 108886637 | B | * | 9/2021 | H04H 20/28 |
| CN | 113660518 | A | * | 11/2021 | H04H 20/28 |
| CN | 113660519 | A | * | 11/2021 | H04H 20/28 |
| CN | 113660520 | A | * | 11/2021 | A61P 27/02 |
| CN | 113660521 | A | * | 11/2021 | A61P 27/02 |
| CN | 113660522 | A | * | 11/2021 | A61P 27/02 |
| CN | 113660523 | A | * | 11/2021 | A61P 27/02 |
| CN | 113660524 | A | * | 11/2021 | A61P 27/02 |
| CN | 113660525 | A | * | 11/2021 | A61P 27/02 |
| CN | 112543381 | B | * | 8/2022 | G06F 3/1454 |
| CN | 111711852 | B | * | 9/2022 | B24B 49/105 |
| CN | 111711851 | B | * | 11/2022 | B24B 49/105 |
| CN | 112543377 | B | * | 2/2023 | G06F 3/1454 |
| CN | 112543379 | B | * | 2/2023 | G06F 3/1454 |
| CN | 112543380 | B | * | 2/2023 | G06F 3/1454 |
| CN | 113259750 | B | * | 2/2023 | H04N 21/431 |
| CN | 111836096 | B | * | 5/2023 | B24B 49/105 |
| CN | 112911398 | B | * | 9/2023 | H04N 21/26283 |
| DE | 19753715 | A1 | * | 6/1999 | H03J 1/0075 |
| DE | 102012221791 | A1 | * | 6/2014 | H04H 20/18 |
| DE | 102018200795 | A1 | * | 7/2019 | |
| EP | 827719 | A1 | * | 3/1998 | A61C 1/0046 |
| EP | 1566859 | A2 | * | 8/2005 | H01Q 15/002 |
| EP | 1659711 | A1 | * | 5/2006 | H04H 20/26 |
| EP | 1659792 | A1 | * | 5/2006 | H04H 20/02 |
| EP | 1863193 | A2 | * | 12/2007 | H04B 7/18517 |
| EP | 1863193 | B1 | * | 9/2010 | H04B 7/18517 |
| ES | 2431084 | T3 | * | 11/2013 | H03J 1/0058 |
| FR | 2765445 | A1 | * | 12/1998 | H04H 20/22 |
| IN | 202141052954 | A | * | 12/2021 | H04N 21/23614 |
| IN | 202341002902 | A | * | 2/2023 | H04H 20/02 |
| IN | 202341007941 | A | * | 2/2023 | H04H 20/33 |
| JP | 2002198957 | A | * | 7/2002 | H04L 63/0442 |
| JP | 2004343639 | A | * | 12/2004 | |
| JP | 2005252965 | A | * | 9/2005 | |
| JP | 2008022047 | A | * | 1/2008 | |
| JP | 4253602 | B2 | * | 4/2009 | |
| JP | 4455652 | B2 | * | 4/2010 | H04H 20/33 |
| JP | 2010109413 | A | * | 5/2010 | |
| JP | 2010130074 | A | * | 6/2010 | |
| JP | 2011223415 | A | * | 11/2011 | H04N 21/4524 |
| JP | 2011223417 | A | * | 11/2011 | |
| JP | 4928525 | B2 | * | 5/2012 | |
| JP | 5003842 | B2 | * | 8/2012 | H04H 20/57 |
| JP | 2013077916 | A | * | 4/2013 | |
| JP | 2013162211 | A | * | 8/2013 | H04H 20/24 |
| JP | 2013179626 | A | * | 9/2013 | |
| JP | 2014126409 | A | * | 7/2014 | |
| JP | 7197661 | B2 | * | 12/2022 | H04H 60/14 |
| JP | 7200326 | B2 | * | 1/2023 | H04H 60/14 |
| JP | 7529396 | B2 | * | 8/2024 | |
| SE | 515967 | C2 | * | 11/2001 | H03J 1/0083 |
| WO | WO-0150648 | A1 | * | 7/2001 | H03J 1/0083 |
| WO | WO-2004036796 | A1 | * | 4/2004 | G11B 20/10 |
| WO | WO-2010109526 | A1 | * | 9/2010 | H04H 20/57 |
| WO | WO-2011052103 | A1 | * | 5/2011 | H04H 20/24 |
| WO | WO-2011129205 | A1 | * | 10/2011 | H04N 21/4524 |
| WO | WO-2011156350 | A2 | * | 12/2011 | H03J 7/18 |
| WO | WO-2012099932 | A1 | * | 7/2012 | H03J 1/0008 |
| WO | WO-2015153587 | A1 | * | 10/2015 | H04B 7/18586 |
| WO | WO-2018235685 | A1 | * | 12/2018 | |
| WO | WO-2022075494 | A1 | * | 4/2022 | H04H 20/86 |

* cited by examiner

Fig. 3

| | | |
|---|---|---|
| 300<br>Latitude | 301<br>Longitude | 302<br>Altitude |

SYSTEM FOR DATA REGIONALIZATION AND RETRANSMISSION BASED ON BROADCAST RECEPTION CONDITIONS AND USER PREFERENCES

FIELD OF THE INVENTION

The present invention relates to the field of digital broadcast radio transmission and reception. More specifically it relates to the field of low reception/no reception of broadcast radio transmission and adding regional data to the original audio during retransmission.

BACKGROUND OF THE INVENTION

A digital broadcasting system consists of transmission of data over different radio frequency bands in digital form using a system of video/audio source, transmitters/receivers or transceivers, mux/demux systems, processors, and display/playback devices.

Digital radios and Televisions use digital technology for transmission and reception of signals over the radio spectrum. Digital radios and Televisions are high quality replacements of their analog counterparts with more features added.

Digital Radio Broadcasting is the standard for broadcasting digital audio radio services. Various services are implanted into one ensemble (multiplex) which include: main radio stations, additional sports commentaries, data services like Electronic Program Guide (EPG), broadcast websites, image series synchronized with audio broadcasts, videos, IP and other data.

However, due to various constraints imposed by terrain and other influencing interferences, even with digital broadcast technologies, some of the regions will still not be able to have a good quality reception. Also a vast majority of the population in such regions would be interested in receiving regionalized data services (such as news, ads, emergency warnings etc specific to their regions) as well without affecting their interest in the main broadcast reception.

Our present invention addresses both low/no reception issues as well as content regionalization blended with the original channel that users of a specific region are interested in.

Most of the time, users in the regions that are very far from the transmitting station and isolated by terrains such as hills, will end up receiving weak signals which a receiver may not be able to demodulate for further processing. Remarkably, even with the weak signals, first channel information in a particular frequency is almost always received by the digital radio receivers. This is due to the fact that in almost all standards (DRM, DRM+, DAB/DAB+, CDR etc.), first channel information is transmitted in 4-QAM modulation which is relatively error free.

Also, often data services (data like local traffic info display, local news display etc.) lack local flavor and audience belonging to all clusters may not benefit from the reception of original transmission.

Some patents which deal with different broadcasting strategies have been discussed below:

The patent U.S. Ser. No. 10/085,235B2 relates to a means of datacasting and is about sending multiple streams of content simultaneously for a targeted group of users by incorporating data from public sources as well. Data is received from a plurality of sources via a one-to-one network. Whereas our present invention involves retransmission of original signal at a regional station using a transceiver and receiver will switch to regional station in case of low or no reception and based on alternate options specified in channel information by the original broadcast. Also, local flavor is added to the original content during retransmission in our present invention.

The U.S. Pat. No. 9,875,489B2 is about dynamically binding and obtaining supplemental content to video content from a TV while our present invention replaces (only) the data services with regional items like local news, local ads, local emergency warnings etc with original audio content. Our present invention is about facilitating receiving original broadcast audio through alternate options along with a local/regional flavor when there is a possibility of low or no reception.

The research paper titled “Dynamic User Preference Based Network Selection for Vertical Handoff in Heterogeneous Wireless Networks” proposes dynamic user preferences in network selection for mobile users, whereas our present invention is about facilitating, receiving original broadcast audio through alternate options along with a local/regional flavor when there is a possibility of low or no reception.

Thus, though different broadcasting systems and experiences exist, there is still a need for improved digital reception and addition of local content in areas of low/poor reception. Our present invention relates to a transmission and reception systems for digital broadcasting in poor reception areas, which contain alternate options for receiving the data along with personalized local data addition based on user preferences, reception data and other parameters.

OBJECTIVE OF THE INVENTION

The main objective of our present invention is to provide a system of re-transmission/reception for poor reception areas such that a re-transmission will enable receivers in the specific region, which are otherwise deprived of a good quality reception from the original transmitter, to receive a superior and playable original audio content.

The other objective of our present invention is also to provide local/other content which will replace the received content based on user preferences, reception parameters and audience options.

The other objective of our present invention is to provide local variants (like local news, local traffic data) that will be added to the original audio broadcast content.

SUMMARY OF THE INVENTION

The following summary is provided to facilitate a clear understanding of the new features in the disclosed embodiment and it is not intended to be a full, detailed description. A detailed description of all the aspects of the disclosed invention can be understood by reviewing the full specification, the drawing and the claims and the abstract, as a whole.

The aim of our present invention is to provide a system capable of addressing the issues of low or no reception and lack of regional content in digital broadcasting systems. Our present invention relates to a system, where, every region identified could have a local Transceiver for the following purposes: 1) Receive Digital Radio broadcasting from far off stations, 2) Demodulate, channel decode, demultiplex and replace (only) the data services with regional items like local news, local ads, local emergency warnings etc., 3) Modulate with new data services and re-transmit to the specific region and also, 4) provide feedback to original radio station on the quality of signal and GPS location through a back channel whereby the original radio station may take further actions (like increasing power or other configurable parameters) to ensure better reception.

BRIEF DESCRIPTION OF THE DRAWINGS

The manner in which the present invention is formulated is given a more particular description below, briefly summarized above, may be had by reference to the components, some of which is illustrated in the appended drawing It is to be noted; however, that the appended drawing illustrates only typical embodiments of this invention and are therefore should not be considered limiting of its scope, for the system may admit to other equally effective embodiments.

Throughout the drawings, the same drawing reference numerals will be understood to refer to the same elements and features.

Figure 1:
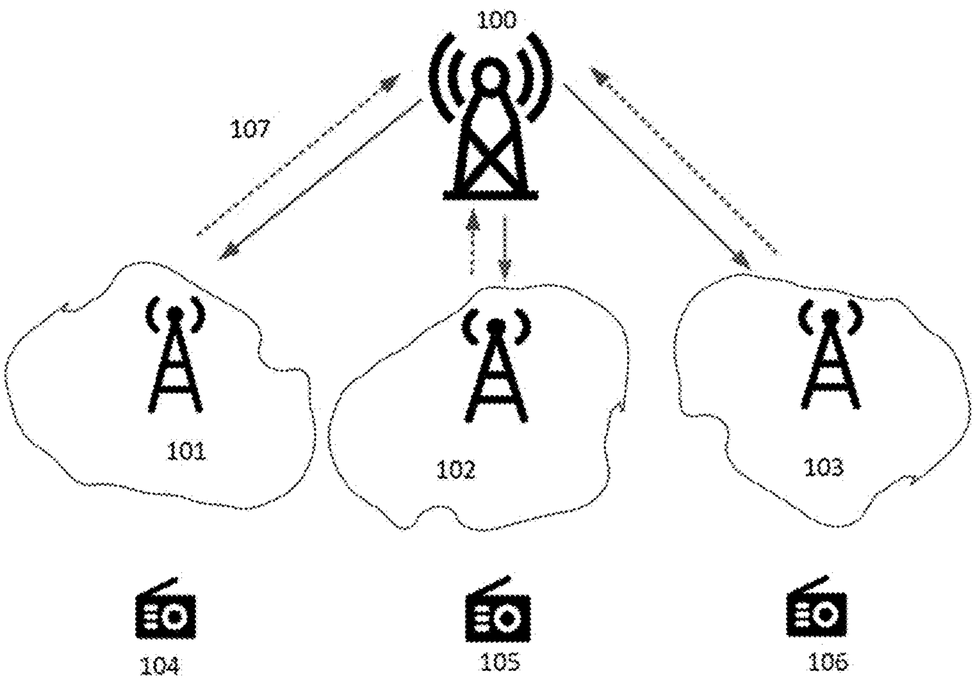
Figure 2:
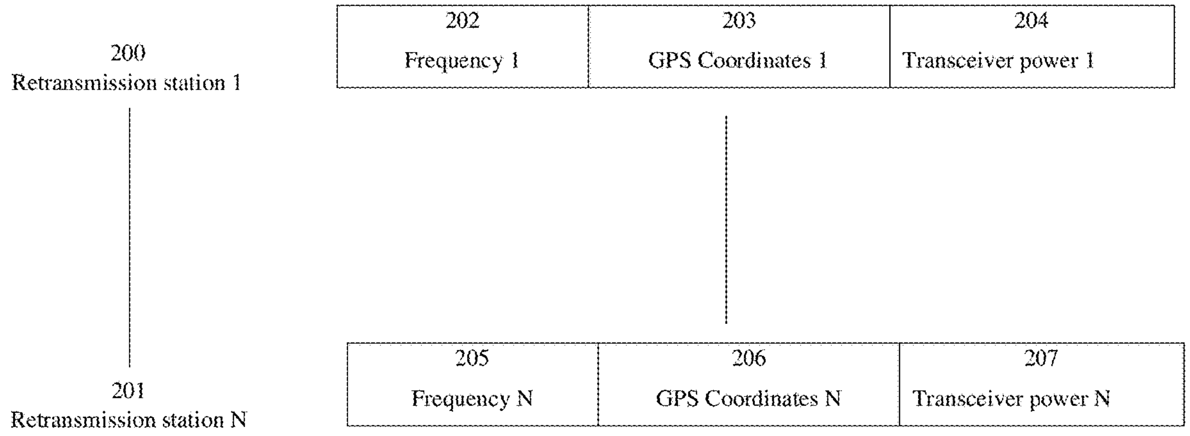
Figure 4:
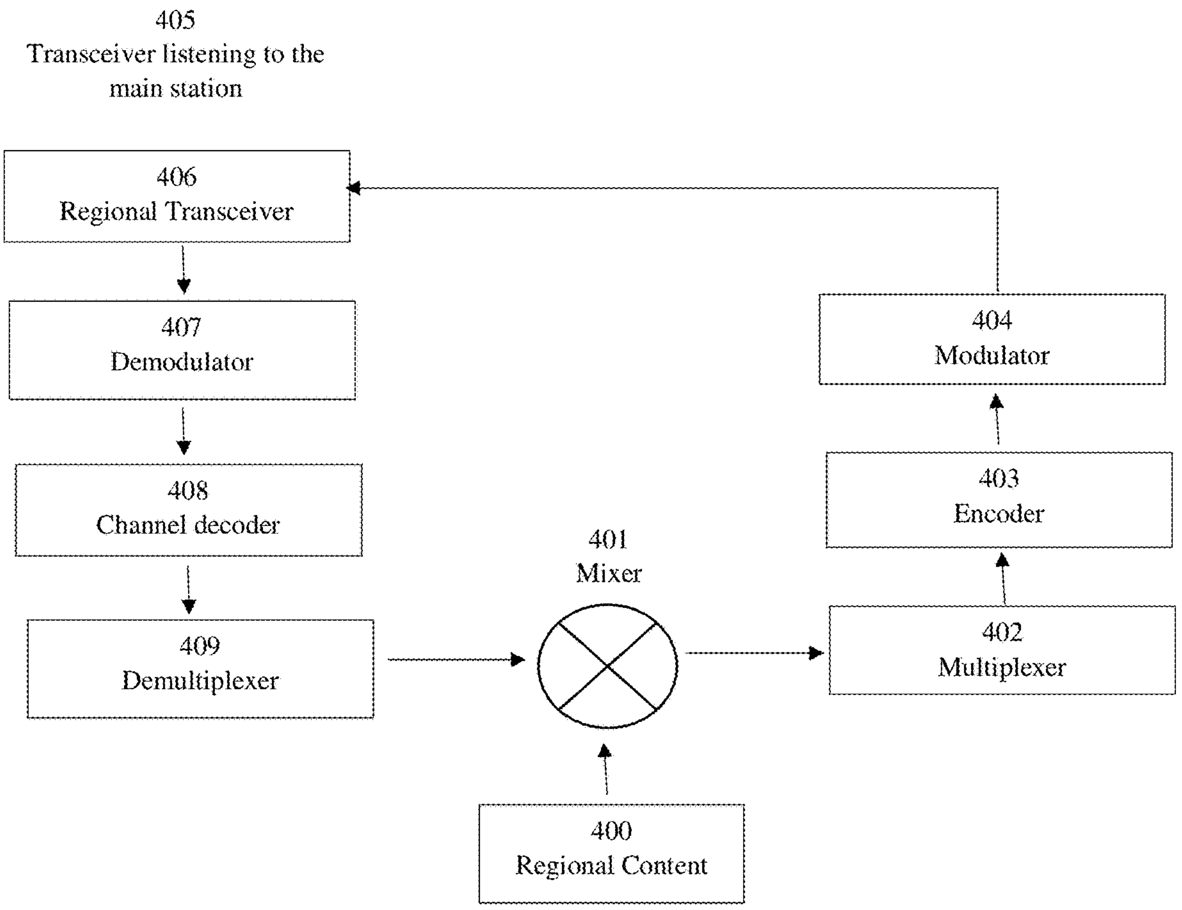
Figure 5:
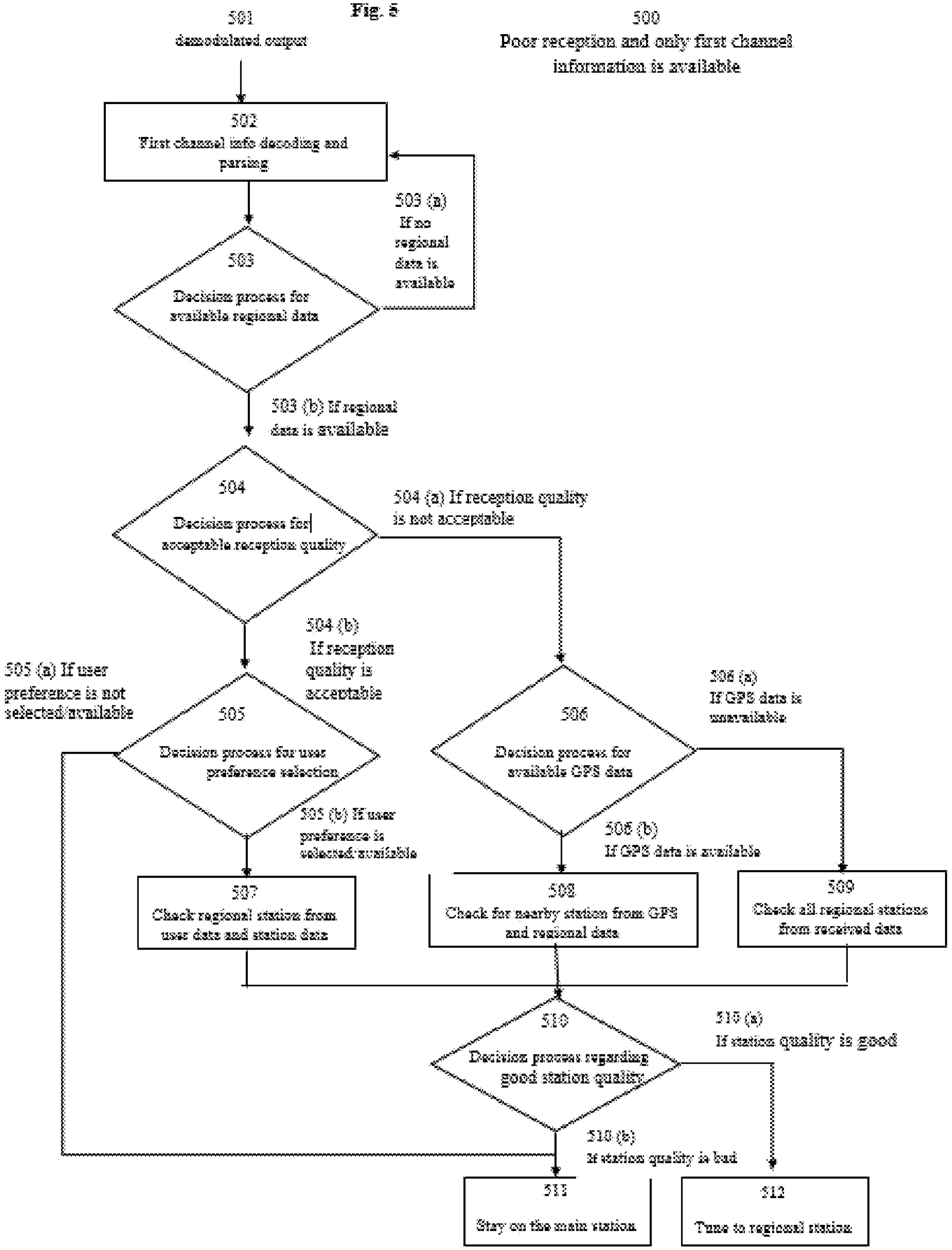
Figure 6:
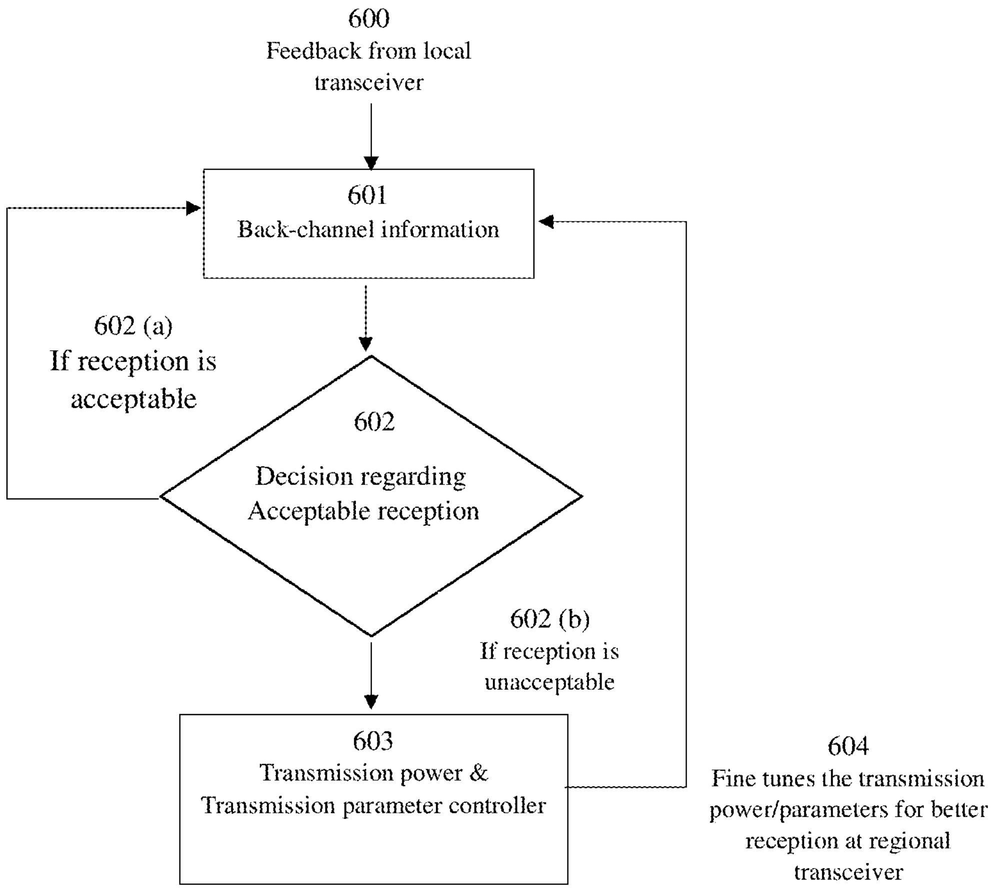

The features and advantages of the present invention will become more apparent from the following detailed description a long with the accompanying figures, which forms a part of this application and in which:

FIG. 1: Block Diagram describing the components of our system for ensuring reception in low or no reception areas and regionalized experience in digital broadcasting in accordance with our present invention;

FIG. 2: Block Diagram describing the structure of retransmission station directly in first channel information of our system in accordance with our present invention;

FIG. 3: Block Diagram describing the structure of GPS coordinates of retransmission station of our system in accordance with our present invention;

FIG. 4: Block Diagram describing the regional transceiver system component of our system in accordance with our present invention;

FIG. 5: Flow Chart Diagram describing the tuning process at digital radio receiver component of our system in accordance with our present invention;

FIG. 6: Flow Chart Diagram describing the transmission fine tuning component of our system in accordance with our present invention;

REFERENCE NUMERALS

100—Main transmitter
101—Local Transceiver 1
102—Local Transceiver 2
103—Local Transceiver N
104—Digital Radio Receivers
105—Digital Radio Receivers
106—Digital Radio Receivers
107—Feedback about reception quality, location and transmission power
200—Retransmission station 1
201—Retransmission station N
202—Frequency 1
203—GPS Coordinates 1
204—Transceiver power 1
205—Frequency N
206—GPS Coordinates N
207—Transceiver power N
300—Latitude
301—Longitude
302—Altitude
400—Regional Content
401—Mixer
402—Multiplexer
403—Encoder
404—Modulator
405—Transceiver listening to the main station
406—Regional Transceiver
407—Demodulator
408—Channel decoder
409—Demultiplexer
500—Poor reception and only first channel information is available
501—demodulated output
502—First channel info decoding and parsing
503—Decision process for available regional data
503(*a*)—If no regional data is available
503(*b*)—If regional data is available
504—Decision process for acceptable reception quality
504(*a*)—If reception quality is not acceptable
504(*b*)—If reception quality is acceptable
505—Decision process for user preference selection
505(*a*)—If user preference is not selected/available
505(*b*)—If user preference is selected/available
506—Decision Process for available GPS data
506(*a*)—If GPS data is unavailable
506(*b*)—If GPS data is available
507—Check regional station from user data and station data
508—Check for nearby station from GPS and regional data
509—Check all regional stations from received data
510—Decision process regarding good station quality
510(*a*)—If station quality is good
510(*b*)—If station quality is bad
511—Stay on the main station
512—Tune to regional station
600—Feedback from local transceiver
601—Back-channel information (Reception quality and GPS location of regional transceiver)
602—Decision regarding acceptable reception
602(*a*)—If reception is acceptable
602(*b*)—If reception is unacceptable
603—Transmission power & Transmission parameter controller
604—Fine tunes the transmission power/parameters for better reception at regional transceiver

DETAILED DESCRIPTION OF THE INVENTION

The principles of operation, design configurations and evaluation values in these non-limiting examples can be varied and are merely cited to illustrate at least one embodiment of the invention, without limiting the scope thereof.

The embodiments disclosed herein can be expressed in different forms and should not be considered as limited to the listed embodiments in the disclosed invention. The various embodiments outlined in the subsequent sections are constructed such that it provides a complete and a thorough understanding of the disclosed invention, by clearly describing the scope of the invention, for those skilled in the art.

Throughout this specification various indications have been given as to preferred and alternative embodiments of the invention. It should be understood that it is the appended claims, including all equivalents, which are intended to define the spirit and scope of this invention.

The current embodiment of the present invention addresses both reception issues as well as content regionalization blended with the original channel that users of a specific region are interested in. The overview of the current embodiment of our present invention is shown in FIG. 1.

The main transmitter (100) sends the signals from the main station which is received through intermediate stations to the local transceiver stations (101, 102, 103). The local transceiver stations send feedback in the form of reception quality, location and transmission power (107) back to the main station. The modified content is then sent to the digital radio receivers (104, 105, 106).

To address the issue to low/no reception and lack of regional contents, every region identified could have a local Transceiver for the following purposes:

Receive Digital Radio broadcasting from far off stations (102, 103, 104, 405)

Demodulate, channel decode, demultiplex and replace (only) the data services with regional items like local news, local ads, local emergency warnings etc. (407, 408, 409, 401)

Modulate with new data services and transmit to the specific region. (404, 406)

Also, provide feedback (600, 107) to the original radio station on the quality of signal and GPS location through a back channel whereby the original radio station may take further actions (like increasing power or other configurable parameters) to ensure better reception, as shown in FIG. 6.

The regional transceiver system component of the present invention is shown in FIG. 4. It adds the regional content (400) which is input to the mixer (401), which then sends the signal to the multiplexer (402), Encoder (403) and the modulator (404) which is then sent to the transceivers listening to the main station (406).

Such a re-transmission will enable receivers in the specific region, which are otherwise deprived of a quality reception from the original transmitter, to receive a superior and playable original audio content along with replaced regionalized data services, in accordance with one embodiment of our present invention.

In another embodiment of our present invention, the regionalized data services may work in tandem with data from social networking services, data agencies to provide personalized advertisements, promotions etc tailored to the localized content of the specific region.

The transmission fine tuning system is described in FIG. 6, wherein, it fine tunes the transmission power/parameters for better reception at regional transceivers (604). The feedback from the local transceiver (600) is parsed for back-channel information like reception quality and GPS location of the regional transceivers (601). If the reception is acceptable (602(*a*)), transmitter configuration/power doesn't need any changes. Else, the transmission power and the transmission parameter controller (603) need to fine tune the transmission power/parameters for better reception at regional transceivers.

Also, in order for the digital radio receiver in a region to identify such re-transmitting stations, first channel information of the original transmitting frequency will contain the following information of all retransmitting stations (200, 201), as shown in FIG. 2:

Transmitting frequency of the re-transmitting station (202, 205)

GPS location (203, 206)

Power of the re-transmitting station (204, 207)

The structure of the GPS coordinates of the retransmission station is shown in the FIG. 3. It consists of the following parameters: Latitude (300), Longitude (301) and altitude (302).

As afore-mentioned, in almost all cases, digital radio receivers are able to decode first channel information, they will always understand the alternate options available for receiving the same content (with local data).

Based on the following parameters, a digital radio receiver will decide which station it will switch to, as shown in FIG. 5:

User preferences (Preference for quality, local data, etc.) (505)

Quality of reception (if receiver is able to pick up more than one retransmitting radio station) (504)

Location of reception (if receiver is able to pick up more than one retransmitting radio station) (506)

In accordance with FIG. 5, the tuning process at the digital radio receiver is given as follows: When the reception is poor and only the first channel information is available (500), the first channel information is decoded and parsed (502) from the demodulated output (501). If regional data is unavailable (503(*a*)), the processing is repeated again.

If the regional data is available (503(*b*)), the reception quality is checked (504). If the reception quality is poor (504(*a*)), GPS data is checked (506). If the GPS data is available (506(*b*)), nearby stations are checked using the GPS and regional data (508). If the GPS data is unavailable (506(*a*)), all regional stations are checked using the received data (509).

If the reception quality is good (504(*b*)), the user preference option is checked (505). If user preference is available (505(*b*)), regional stations from user data and station data is checked (507). Next the station quality is checked (510). If it is good (510(*a*)), the regional station is tuned (512) into or else the station stays tuned to the main station data (511).

If user preference is unavailable or not selected 505(*a*), the option to stay on the main station is selected 511.

The main advantages of the present invention are:

1) Increased reception quality
2) A feedback-based transmission and reception system that works dynamically to suit the current weather pattern, system shutdowns etc.
3) Regionalized content based on many parameters like user preferences, local data, station quality, data quality, etc.
4) Regionalization provides more personalized and relatable content to the user, enhancing their experience.
5) Revenue for the main program content increases with specific regional sponsoring.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope of the invention as claimed.

We claim:

1. A system configured to ensure reception in low reception/no reception areas and add regionalized experience in digital broadcasting, the system comprising:

a main transmitter station;

a plurality of local or regional transceiver stations to receive transmitted signals from the main transmitter station, wherein the plurality of local or regional transceiver stations send feedback to the main transmitter station to fine tune the transmitted signals based on at least one attribute, and wherein the plurality of localized or regional transceiver stations add localized or regional content to the transmitted signals based on at least one parameter; and a digital radio receiver configured to receive the transmitted signals from the main transmitter station and the plurality of local or regional transceiver stations, wherein the digital radio receiver is configured to decode and parse a first channel information from demodulated output when reception of the transmitted signals is poor and only the first channel information is available.

2. The system of claim 1, further comprising, in areas of poor reception, a local transceiver station of the plurality of local or regional transceiver stations located in a specific region, wherein the local transceiver station is configured to receive digital radio broadcasting services from a remote station, demodulate audio and data services in the received digital radio broadcasting services, channel decode the audio and data services, demultiplex the audio and data services, replace the data services with regional items, modulate original audio along with new data services, and transmit the original audio along with the new data services to the specific region.

3. The system of claim 2, wherein the local transceiver station further is configured to provide feedback to the main transmitter station on a quality of a received signal and a global positioning system (GPS) location through a back channel.

4. The system of claim 3, wherein the main transmitter station is configured to take an action to ensure better reception of the received signal to the local transceiver.

5. The system of claim 4, wherein the action includes increasing power and other modulation parameters of the transmitted signal from the main transmitter station.

6. The system of claim 2, wherein the new data services include local news, a local advertisement, or a local emergency warning.

7. The system of claim 1, wherein the at least one attribute includes reception quality or location.

8. The system of claim 1, wherein the at least one parameter includes user preferences or local data.

9. The system of claim 1, wherein the local or regional content may vary based on the at least one parameter.

10. The system of claim 1, wherein a structure of a first channel information from the main transmitter station consists of a transmission frequency of the local or regional transceiver station, GPS coordinates, which contain GPS information having latitude, longitude, and altitude, and transceiver power.

11. The system of claim 1, wherein the digital radio receiver is configured to determine a local or regional transceiver station of the plurality of local or regional transceiver stations based on a user preference.

12. The system of claim 1, wherein the digital radio receiver is configured to determine a local or regional transceiver station of the plurality of local or regional transceiver stations based on a quality of reception if the digital radio receiver is able to receive transmitted signals from more than one local or regional transceiver station.

13. The system of claim 1, wherein the digital radio receiver is configured to determine a local or regional transceiver station of the plurality of local or regional transceiver stations based on a location of reception if the digital radio receiver is able to receive transmitted signals from more than one local or regional transceiver station.

14. The system of claim 1, wherein the digital radio receiver is configured to check reception quality if regional data is available.

15. The system of claim 14, wherein the digital radio receiver is configured to check GPS data if the reception quality is poor.

16. The system of claim 15, wherein the digital radio receiver is configured to check nearby transceiver stations using the GPS data and the regional data if the GPS data is available.

17. The system of claim 15, wherein the digital radio receiver is configured to check all regional transceiver stations using the received data if the GPS data is unavailable.

18. The system of claim 1, wherein the digital radio receiver is configured to check a user preference option if a reception quality is good.

* * * * *